United States Patent
Shi et al.

(10) Patent No.: US 9,794,075 B2
(45) Date of Patent: Oct. 17, 2017

(54) REDUCING CURRENT TRANSIENTS IN ENERGY EFFICIENT EHTERNET DEVICES

(71) Applicant: QUALCOMM INCORPORATED, San Diego, CA (US)

(72) Inventors: Qing Shi, Shanghai (CN); Lingyun Cai, Shanghai (CN); James Qian Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/034,538

(22) PCT Filed: Dec. 12, 2013

(86) PCT No.: PCT/CN2013/089226
§ 371 (c)(1),
(2) Date: May 4, 2016

(87) PCT Pub. No.: WO2015/085540
PCT Pub. Date: Jun. 18, 2015

(65) Prior Publication Data
US 2016/0359638 A1    Dec. 8, 2016

(51) Int. Cl.
*H04L 12/00* (2006.01)
*H04B 1/00* (2006.01)
(Continued)

(52) U.S. Cl.
CPC ............ *H04L 12/10* (2013.01); *G06F 1/3278* (2013.01); *H02J 9/005* (2013.01); *H04B 1/0028* (2013.01);
(Continued)

(58) Field of Classification Search
CPC ................. H04L 12/66; H04L 12/2801; H04L 29/06027
See application file for complete search history.

(56) References Cited

U.S. PATENT DOCUMENTS

| | | | |
|---|---|---|---|
| 2005/0057547 A1 | 3/2005 | Iwabuchi et al. | |
| 2006/0100799 A1* | 5/2006 | Karam | G06F 1/26 702/57 |

(Continued)

FOREIGN PATENT DOCUMENTS

| | | |
|---|---|---|
| CN | 103095464 A | 5/2013 |
| EP | 2479924 A1 | 7/2012 |

OTHER PUBLICATIONS

International Search Report and Written Opinion—PCT/CN2013/089226—ISA/EPO—Oct. 13, 2014.
(Continued)

*Primary Examiner* — Ross Varndell
(74) *Attorney, Agent, or Firm* — Paradice and Li LLP

(57) ABSTRACT

An Ethernet device is disclosed that may reduce transient currents and/or power consumption while entering and exiting a low power mode by selectively powering-on and/or powering-off a number of transceiver components at different times (e.g., in a staggered manner). The transient currents and/or power consumption may be further reduced by assigning different quiet period durations to different transceiver chains, for example, to minimize the number of transceiver components that enter and/or exit the low power mode at the same time.

26 Claims, 9 Drawing Sheets

(51) Int. Cl.
*H04L 12/10* (2006.01)
*H02J 9/00* (2006.01)
*H04B 1/40* (2015.01)
*G06F 1/32* (2006.01)
*H04L 12/66* (2006.01)
*H04L 29/06* (2006.01)
*H04L 12/28* (2006.01)

(52) U.S. Cl.
CPC ............ *H04B 1/40* (2013.01); *H04L 12/2801* (2013.01); *H04L 12/66* (2013.01); *H04L 29/06027* (2013.01)

(56) References Cited

U.S. PATENT DOCUMENTS

| | | |
|---|---|---|
| 2008/0253356 A1 | 10/2008 | Berman et al. |
| 2011/0191608 A1 | 8/2011 | Vetteth |
| 2011/0200048 A1* | 8/2011 | Thi .......................... H04B 3/23 |
| | | 370/392 |

OTHER PUBLICATIONS

Supplementary European Search Report—EP13899255, Search Authority—Munich, Jun. 29, 2017.

\* cited by examiner

REDUCING CURRENT TRANSIENTS IN ENERGY EFFICIENT EHTERNET DEVICES

TECHNICAL FIELD

The present embodiments relate generally to Ethernet devices, and specifically to reducing current transients in Ethernet devices.

BACKGROUND OF RELATED ART

Among the technologies that allow computers and/or other network devices to form a local area network (LAN), Ethernet has become the dominant networking technology and is standardized in the IEEE 802.3 family of standards. The Ethernet standard has evolved over time so that different variants of the Ethernet protocol now exist to support higher bandwidth, improved media access controls, different physical media channels, and/or other functionalities. For example, IEEE 802.3 now has variants covering speeds (or transmission rates) ranging from 10 Mbit/s, 100 Mbit/s, 1 Gbit/s, to 10 Gbit/s and even higher, and has variants that govern physical channels such as coaxial cables, fiber-optics, and unshielded/shielded twisted-pair cables.

The IEEE 802.3 family of standards also includes the IEEE 802.3az standard, which describes Energy Efficient Ethernet (EEE), a standard designed to reduce power consumption in Ethernet devices. Because many Ethernet devices employ transceivers that may operate at very high speeds (e.g., 1 Gbit/s or 10 Gbit/s), such devices may consume a significant amount of power when transmitting and receiving data. To reduce power consumption, EEE-compliant devices may use a low power idle (LPI) signal to place its transceiver (or the transmit portions of the transceiver) into a low power mode when there is little or no data being transmitted over an associated data link. The transceiver remains in the low power mode for a duration of time commonly referred to as its "quiet period." Once the quiet period ends, the transceiver may wake up and perform a refresh operation (e.g., to ready itself for transmit operations).

When there is data to be transmitted, the low power mode may be terminated by de-asserting the LPI signal, which in turn wakes up the transceiver (or the transmit portions of the transceiver). However, periodically powering-on and powering-off the transceiver (or the transmit portions of the transceiver) may induce significant current transients (e.g., significant amounts of current change in an instantaneous or short duration of time) within the transceiver, which in turn may cause improper operation and/or damage to various circuit components of the transceiver. This problem may be exacerbated for multi-port Ethernet devices, for example, because of the greater number of transceiver components that may be simultaneously powered on and off in response to the LPI signal (e.g., as compared with single-port Ethernet devices).

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

In accordance with the present embodiments, an Ethernet device is disclosed that may reduce transient currents and/or power consumption while entering and exiting a low power mode by selectively powering-on and/or powering-off a number of transceiver components at different times (e.g., in a staggered manner). The transient currents and/or power consumption may be further reduced by assigning different quiet period durations to different transceiver chains, for example, to minimize the number of transceiver components that enter and/or exit the low power mode at the same time.

For some embodiments, the Ethernet device includes a media access control (MAC) device to provide a low-power idle (LPI) signal; a first port coupled to a plurality of first external communication channels; and a physical (PHY) device, coupled to the MAC device via a media independent interface (MII), comprising: a transceiver including a plurality of first transceiver chains, each coupled to a corresponding one of the first external communication channels via the first port, wherein each of the first transceiver chains includes at least a digital-to-analog converter (DAC) and an analog-to-digital converter (ADC); and a control circuit, coupled to the first transceiver chains, to power on the ADCs and the DACs of each of the first transceiver chains at different times based on the LPI signal. The control circuit may generate a plurality of first control signals, wherein each of the first control signals is provided to a corresponding one of the first transceiver chains, and wherein the first control signals are to be de-asserted in a staggered manner with respect to one another. For at least one embodiment, the control circuit may assign a different quiet period duration to each of the first transceiver chains, wherein the different quiet period durations are within a range of predetermined durations of time compliant with the IEEE 802.3az standards. For some embodiments, a pseudo-random number generator may randomly select the different quiet period durations, and/or timers may be used to store the quiet period durations for corresponding transceiver chains.

The Ethernet device may include a second port coupled to a plurality of second external communication channels, wherein the transceiver includes a plurality of second transceiver chains, each coupled to a corresponding one of the second external communication channels via the second port, wherein each of the second transceiver chains includes at least a DAC and an ADC; and the control circuit is to power on the ADCs and the DACs of the second transceiver chains at different times than the ADCs and the DACs of the first transceiver chains. For such embodiments, the control circuit may generate a plurality of second control signals, wherein each of the second control signals is provided to a corresponding one of the second transceiver chains, and wherein the second control signals are to be de-asserted in a staggered manner with respect to the first control signals. The control circuit may assign different quiet period durations to the first transceiver chains and the second transceiver chains. By selectively powering-on and/or powering-off various transceiver components at different times (e.g., in a staggered manner), current transients associated with powering-on and/or powering-off the various transceiver components may be minimized (e.g., as compared to conventional Ethernet devices that power-on and/or power-off various components of multiple transceiver chains at the same time).

BRIEF DESCRIPTION OF THE DRAWINGS

The present embodiments are illustrated by way of example and are not intended to be limited by the figures of the accompanying drawings, where like reference numerals refer to corresponding parts throughout the drawing figures.

DETAILED DESCRIPTION

The present embodiments are described below in the context of an Ethernet device for simplicity only. It is to be understood that the present embodiments may be implemented in any suitable network device that may operate according one or more other communication protocols. In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

Figure 1:
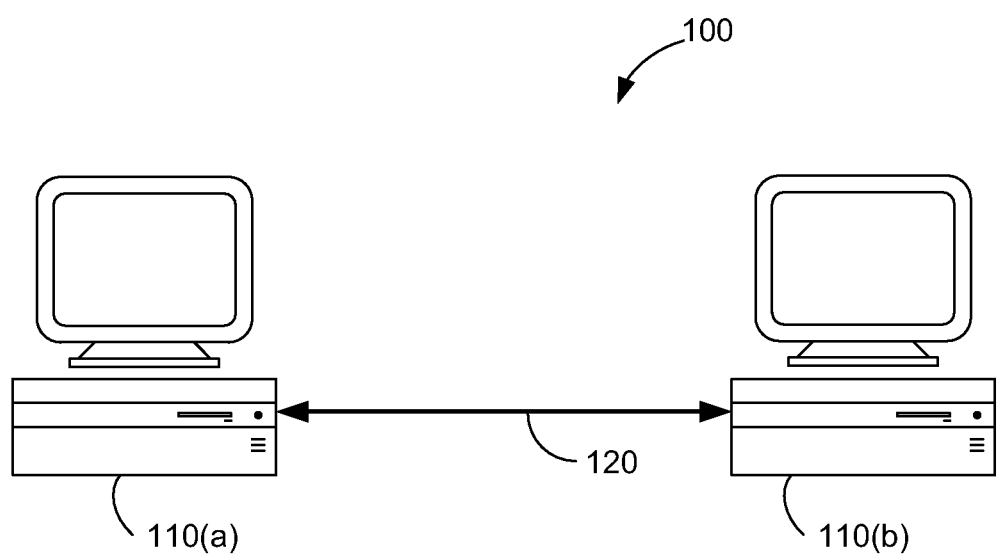
FIG. 1 is a block diagram of a system within which the present embodiments may be implemented.

FIG. 1 is a block diagram of an exemplary communication system 100 within which the present embodiments may be implemented. Communication system 100 is shown to include two network devices 110(a) and 110(b), which are coupled to each other by an established data link 120. Network devices 110(a) and 110(b) may be any suitable network-enabled devices including, for example, computers, switches, routers, hubs, gateways, access points, or the like. Also, according to the present embodiments, network devices 110(a) and 110(b) may include any electronic device capable of connecting to either a wired or a wireless network including, for example, a mobile phone, a personal digital assistant (PDA), a set-top box, or a game console. Note that network devices 110(a) and 110(b) and data link 120 are exemplary components of a network, as the network may further include any number of suitable devices to form a larger network including, for example, a local area network (LAN), a wide area network (WAN), a wireless LAN (WLAN), and/or may be connected to the Internet. Data link 120 may be any suitable physical media including, for example, coaxial cables, fiber-optic cables, and/or unshielded/shielded twisted pairs.

Network devices 110(a)-110(b) may communicate with each other using Ethernet technologies, as described in the IEEE 802.3 family of standards. More specifically, for exemplary embodiments described herein, network devices 110(a)-110(b) are each equipped with Ethernet-compliant transceivers (not shown in FIG. 1 for simplicity) that may be capable of transmitting and receiving data at speeds of at least 1 Gbit/s, and may be backwards compatible to operate at slower speeds, for example, 100 Mbit/s or 10 Mbit/s. Furthermore, network devices 110(a)-110(b) are capable of reducing the power consumption of their transceivers when not transmitting any data in a manner that is compliant with the IEEE 802.3az standards (EEE).

Figure 7:
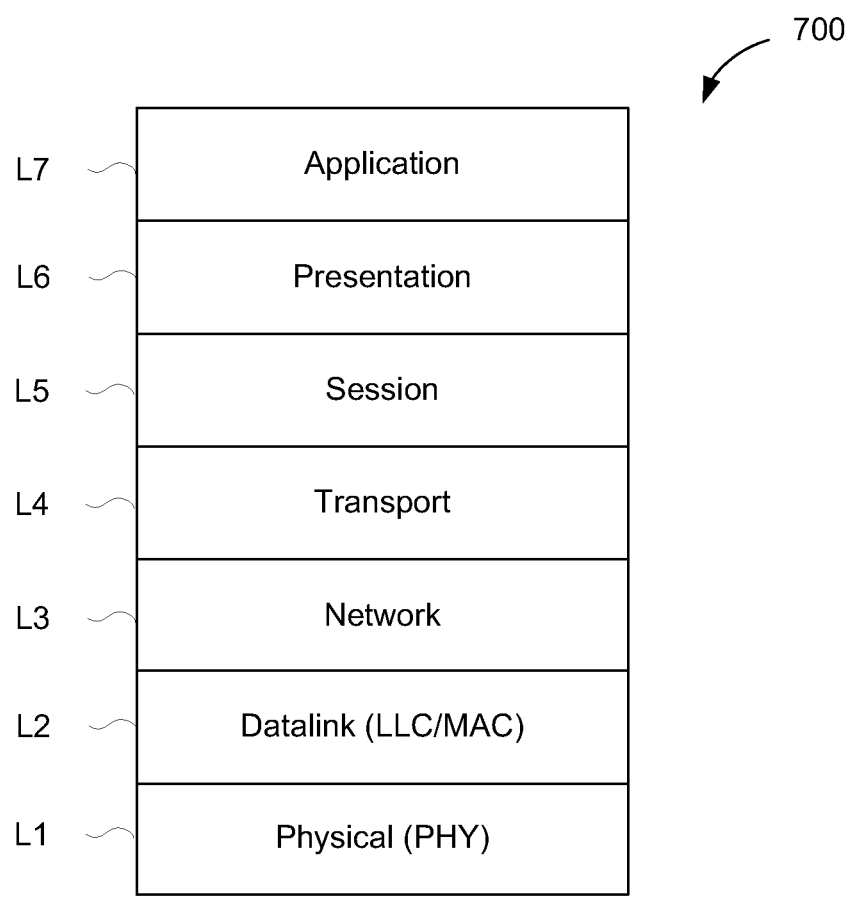
FIG. 7 is a block diagram of the open system interconnection (OSI) model representative of the devices of FIG. 1.

FIG. 7 is a block diagram of the open system interconnection (OSI) model 700 representative of the devices 110(a)-110(b) of FIG. 1. As depicted in FIG. 7, the OSI model 700 is divided into seven logical layers: an application layer (L7); a presentation layer (L6); a session layer (L5); a transport layer (L4); a network layer (L3); a datalink layer (L2); and a physical layer (L1). Although the OSI model 700 may be used to represent devices 110(a)-110(b) for purposes of discussion herein, it is noted that other suitable models maybe used to represent Ethernet devices configured in accordance with the present embodiments.

The higher in hierarchy an OSI layer is, the closer it is to an end user; the lower in hierarchy an OSI layer is, the closer it is to a physical channel. For example, on the top of the OSI model hierarchy is the application layer, which interacts directly with the end user's software application (not shown in FIG. 7 for simplicity). On the contrary, on the bottom of the OSI model hierarchy is the physical layer, which defines the relationship between a network device and a physical communication medium, such as twisted-pairs for Ethernet data transmissions.

More specifically, the physical layer provides electrical and physical specifications, including details like pin layouts and signal voltages, for interactions between its host (e.g., device 110(a)) and the physical channel (e.g., link 120). The datalink layer provides the functional and/or procedural details, such as addressing and channel access control mechanisms, for data transmissions between devices 110(a)-110(b). The datalink layer includes two sub-layers, which are the logical link control (LLC) layer on the top (in terms of hierarchy), and the MAC layer on the bottom. For simplicity, the datalink layer is sometimes referred to herein as the MAC layer in the following discussion. Further, although not shown for simplicity in FIG. 7, an interface exists between the MAC layer and the physical layer to facilitate the exchange of information between the two layers. This interface is commonly referred to as a media independent interface (MII) because the MAC layer is agnostic as to the physical medium used for transmission. As used herein, the terms "media access interface" and "MII" refer to the entire genus of such interfaces, unless otherwise noted. Examples of MIIs include Attachment Unit Interface (AUI), MII, Reduced MII, Gigabit MII (GMII), Reduced GMII, Serial GMII (SGMII), Quad SGMII (QSGMII), 10GMII, and Source Synchronous Serial MII (S3MII). The MII allows devices 110(*a*)-110(*b*) to interface with different types of physical channels (e.g., channel 120) without replacing their MAC devices.

Figure 2A:
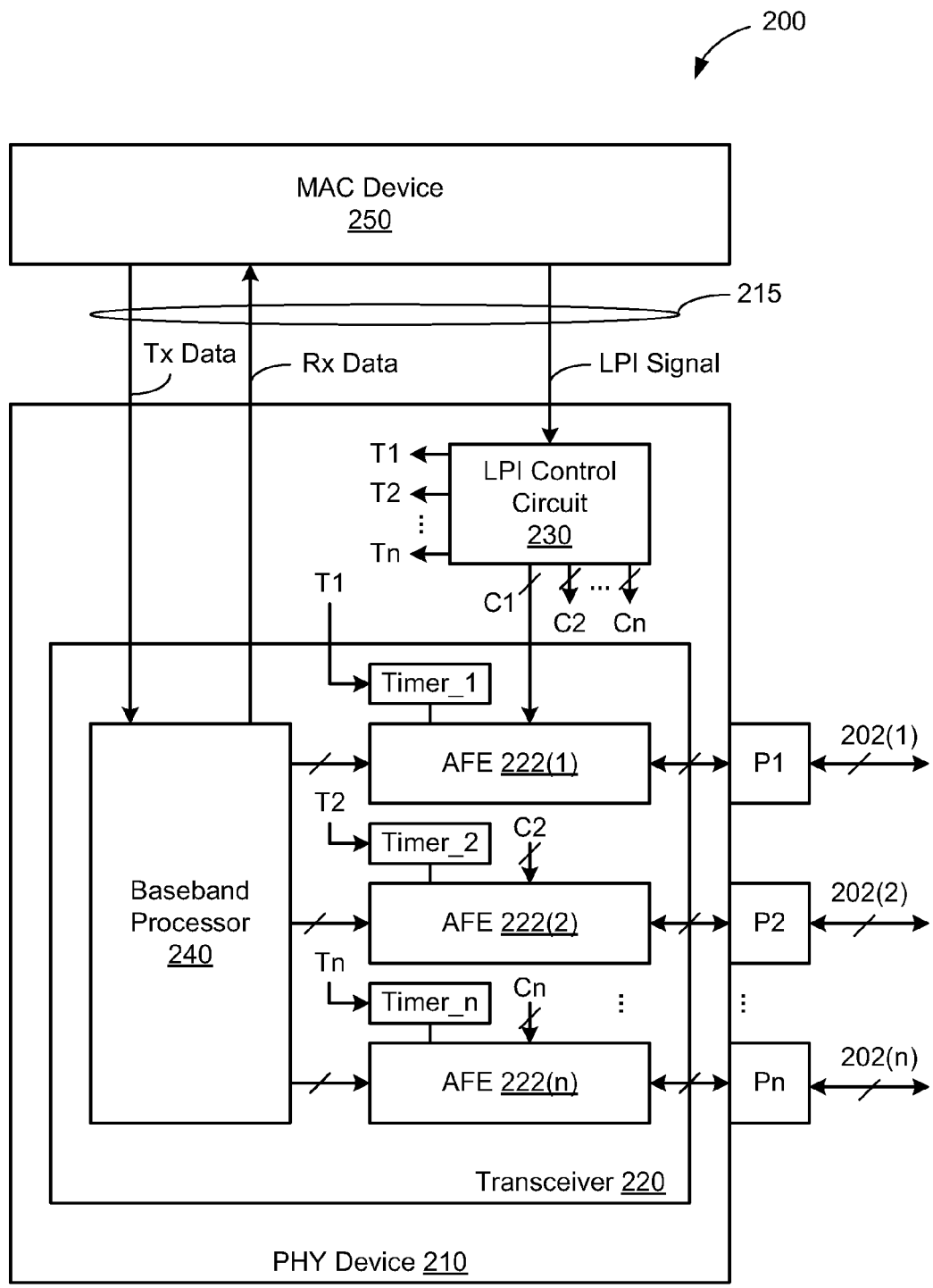
FIG. 2A is a block diagram of a network-enabled device in accordance with some embodiments.

FIG. 2A illustrates an Ethernet device 200 that may be one embodiment of network device 110(*a*) and/or network device 110(*b*) of FIG. 1. Device 200 includes a PHY device 210, a MAC device 250, an MII 215, and a plurality of ports P1-Pn. PHY device 210 and MAC device 250 are coupled together by MII 215, which may be any suitable MII (e.g., a SGMII). MAC device 250 is responsible for generating (e.g., asserting and de-asserting) the LPI signal, and exchanges data with PHY device 210 via the MII 215. Ports P1-Pn are coupled to communication links 202(1)-202(*n*), respectively.

PHY device 210 includes a transceiver 220 and an LPI control circuit 230. Transceiver 220 includes a baseband processor 240 and a plurality of analog front end (AFE) circuits 222(1)-222(*n*), each of which may be coupled to a respective one of communication links 202(1)-202(*n*) via a respective one of ports P1-Pn, as depicted in FIG. 2A. For exemplary embodiments described herein, transceiver 220 may be compatible with the 100BASE-T or 1000BASE-T standards (or similar standards), and each of communication links 202(1)-202(*n*) may include four twisted pairs of a Category 5 (Cat 5) cable. Thus, for exemplary embodiments described herein, each of AFE circuits 222(1)-222(*n*) may support four communication channels associated with each of respective communication links 202(1)-202(*n*) (although for other embodiments, one or more of AFE circuits 222(1)-222(*n*) may support other numbers of communication channels).

The LPI control circuit 230 includes an input to receive an LPI signal from MAC device 250, includes a first set of outputs to generate a plurality of control signals C1-Cn, and includes a second set of outputs to generate a plurality of timer signals T1-Tn. Each of the control signals C1-Cn is provided to a respective one of AFE circuits 222(1)-222(*n*) to selectively power-off and/or power-on a number of components therein at different times (e.g., in a staggered manner), as described in more detail below. Each of the timer signals T1-Tn is provided to a respective one of timer circuits (Timer_1-Timer_n), which in turn are coupled to respective AFE circuits 222(1)-222(*n*). As described in more detail below, the timer signals T1-Tn may be used to assign different quiet period durations to AFE circuits 222(1)-222 (*n*), for example, in a manner that minimizes transient currents therein.

Figure 2B:
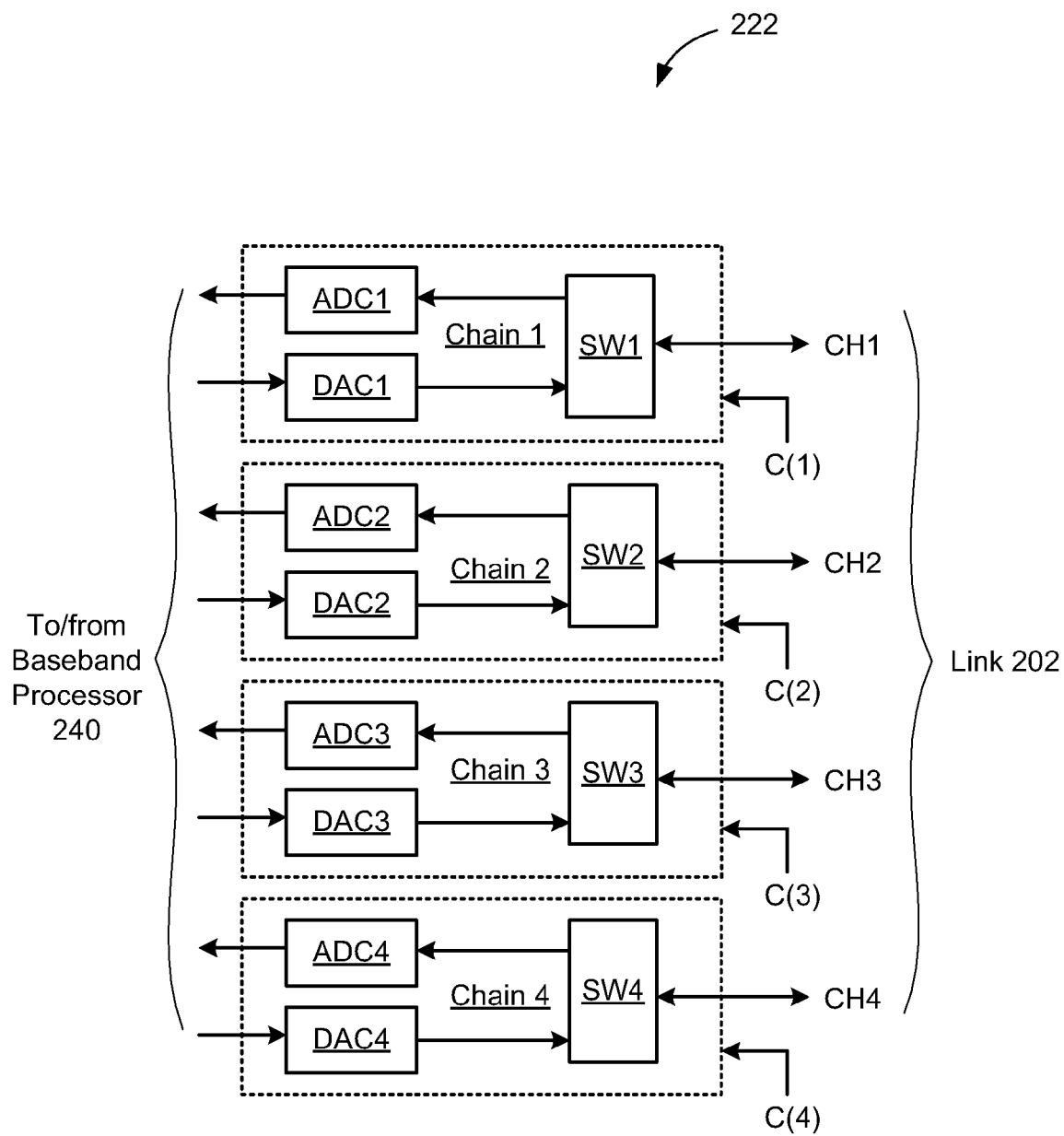
FIG. 2B is a block diagram of an exemplary analog front end (AFE) circuit in accordance with some embodiments.

Each of the AFE circuits 222(1)-222(*n*) may include a plurality of well-known components including, for example, digital-to-analog converters (DACs), analog-to-digital converters (ADCs), filters, mixers, amplifiers, and so on. More specifically, for exemplary embodiments described herein, each of AFE circuits 222(1)-222(*n*) may include four pairs of DACs and ADCs, wherein each pair of DACs and ADCs may be coupled to a corresponding one of the four channels of a respective one of communication links 202(1)-202(*n*). For example, FIG. 2B shows an exemplary AFE circuit 222 coupled to an associated communication link 202. AFE circuit 222 is shown to include four transceiver chains 1-4. Transceiver chain 1 includes a first ADC (ADC1) and a first DAC (DAC1) coupled to a first channel (CH1) of link 202 via a first switch (SW1). Transceiver chain 2 includes a second ADC (ADC2) and a second DAC (DAC2) coupled to a second channel (CH2) of link 202 via a second switch (SW2). Transceiver chain 3 includes a third ADC (ADC3) and a third DAC (DAC3) coupled to a third channel (CH3) of link 202 via a third switch (SW3). Transceiver chain 4 includes a fourth ADC (ADC4) and a fourth DAC (DAC4) coupled to a fourth channel (CH4) of link 202 via a fourth switch (SW4). Each of ADC1-ADC4 provides signals to baseband processor 240, and each of DAC1-DAC4 receives signals from baseband processor 240. The switches SW1-SW4, which may be implemented within the AFE 222 or in the port, may selectively couple each of channels CH1-CH4 to either the ADC (e.g., during receive operations) or the DAC (e.g., during transmit operations) of the corresponding transceiver chain.

AFE circuit 222 is also shown to receive a plurality of control signals C(1)-C(4), which may be generated by the LPI control circuit 230 of FIG. 2A. The control signals C(1)-C(4), which together may form one of the control signals C1-Cn of FIG. 2A, are provided to respective transceiver chains 1-4. For some embodiments, assertion of a given one of control signals C(1)-C(4) may power-off the DAC and ADC of the corresponding transceiver chain, and de-assertion of the given one of control signals C(1)-C(4) may power-on the DAC and ADC of the corresponding transceiver chain. In this manner, the ADC and DAC of each transceiver chain may be powered-off and/or powered-on at a different time (e.g., relative to the ADC and DAC of other transceiver chains) by selectively asserting and/or de-asserting the control signals C(1)-C(4) at different times.

An exemplary operation of device 200 is described below with respect to FIGS. 2A and 2B. When there is little or no data to be transmitted by the device 200, MAC device 250 may place the transceiver 220 in a low power mode by providing an asserted LPI signal to the PHY device 210. In response to the asserted LPI signal, the LPI control circuit 230 may selectively stagger assertion of control signals C1-Cn so that, for each of AFE circuits 222(1)-222(*n*), the DACs and ADCs therein are to power-off at different times (e.g., asynchronously or in a staggered manner). For example, referring to FIG. 2B, assertion of control signal C(1) may cause ADC1 and DAC1 of transceiver chain 1 to be powered-off at a first time t1, assertion of control signal C(2) may cause ADC2 and DAC2 of transceiver chain 2 to be powered-off at a second time t2 (e.g., after time t1), assertion of control signal C(3) may cause ADC3 and DAC3 of transceiver chain 3 to be powered-off at a third time t3 (e.g., after time t2), and assertion of control signal C(4) may cause ADC4 and DAC4 of transceiver chain 4 to be powered-off at a fourth time t4 (e.g., where t4 is after time t3). By powering-off pairs of ADCs and DACs within each AFE circuit 222 at different times (e.g., in a staggered manner), undesirable current transients may be avoided. For an exemplary embodiment, time t2 is approximately 0.05 µs after t1, time t3 is approximately 0.05 µs after t2, and time t4 is approximately 0.05 µs after t3, although the durations between times t1-t4 may of different values.

Similarly, when the transceiver 220 is in the low power mode and is to be woken up (e.g., to resume data transmissions with another network-enabled device), MAC device 250 may de-assert the LPI signal (or alternatively provide a normal idle signal). In response thereto, the LPI control circuit 230 may selectively stagger de-assertion of control signals C1-Cn so that, for example, for each of AFE circuits 222(1)-222(*n*), the DACs and ADCs therein are to power-on at different times (e.g., asynchronously or in a staggered manner). By powering-on pairs of ADCs and DACs within each AFE circuit 222 at different times (e.g., in a staggered manner), undesirable current transients may be avoided.

For some embodiments, the LPI control circuit 230 may also assign different durations of time for the quiet periods associated with the AFE circuits 222(1)-222(n). As mentioned above, in addition to controlling the times at which the DACs and ADCs of each of AFE circuits 222(1)-222(n) are to be powered-off and/or powered-on, the LPI control circuit 230 may also assign different values for timer signals T1-Tn provided to respective timers Timer_1-Timer_n. The different values for timer signals T1-Tn may cause respective AFE circuits 222(1)-222(n) to have different quiet periods (and may also cause the transceiver chains within any given AFE circuit 222 to have different quiet periods) but yet be compliant with the range of quiet period durations specified by the IEEE 802.3az standards. Currently, the IEEE 802.3az standard specifies that the quiet period duration may be between 20 ms and 24 ms, and therefore (for at least some embodiments) the timer values provided by timer signals T1-Tn may vary between 20 ms and 24 ms.

More specifically, the LPI control circuit 230 may assign varying quiet period durations (e.g., as indicated by count values embedded within timer signals T1-Tn) to respective timers Timer_1-Timer_n. Then, when the transceiver 220 is placed in the low power mode (e.g., in response to an asserted LPI signal), each of the timers Timer_1-Timer_n begins counting down from the count value set by the corresponding timer signal T1-Tn. When a given one of timers Timer_1-Timer_n reaches a zero count value (or any other value indicating expiration of the assigned quiet period duration), the timer causes the corresponding one of AFE circuits 222(1)-222(n) to wake-up from the quiet period (e.g., to begin a refresh operation). In this manner, AFE circuits 222(1)-222(n) may power-on various components (e.g., associated with commencing refresh operations) at different times by assigning different quiet period durations to the AFE circuits 222(1)-222(n), which in turn may reduce current transients (e.g., as compared with conventional transceivers having a plurality of AFE circuits that wake-up from the quiet period at the same time). In addition, successive quiet period durations for a given AFE circuit 222/Port pair may vary, for example, so that different quiet period durations are rotated between the various AFE circuits 222(1)-222(n) and corresponding Ports P1-Pn.

Figure 6A:
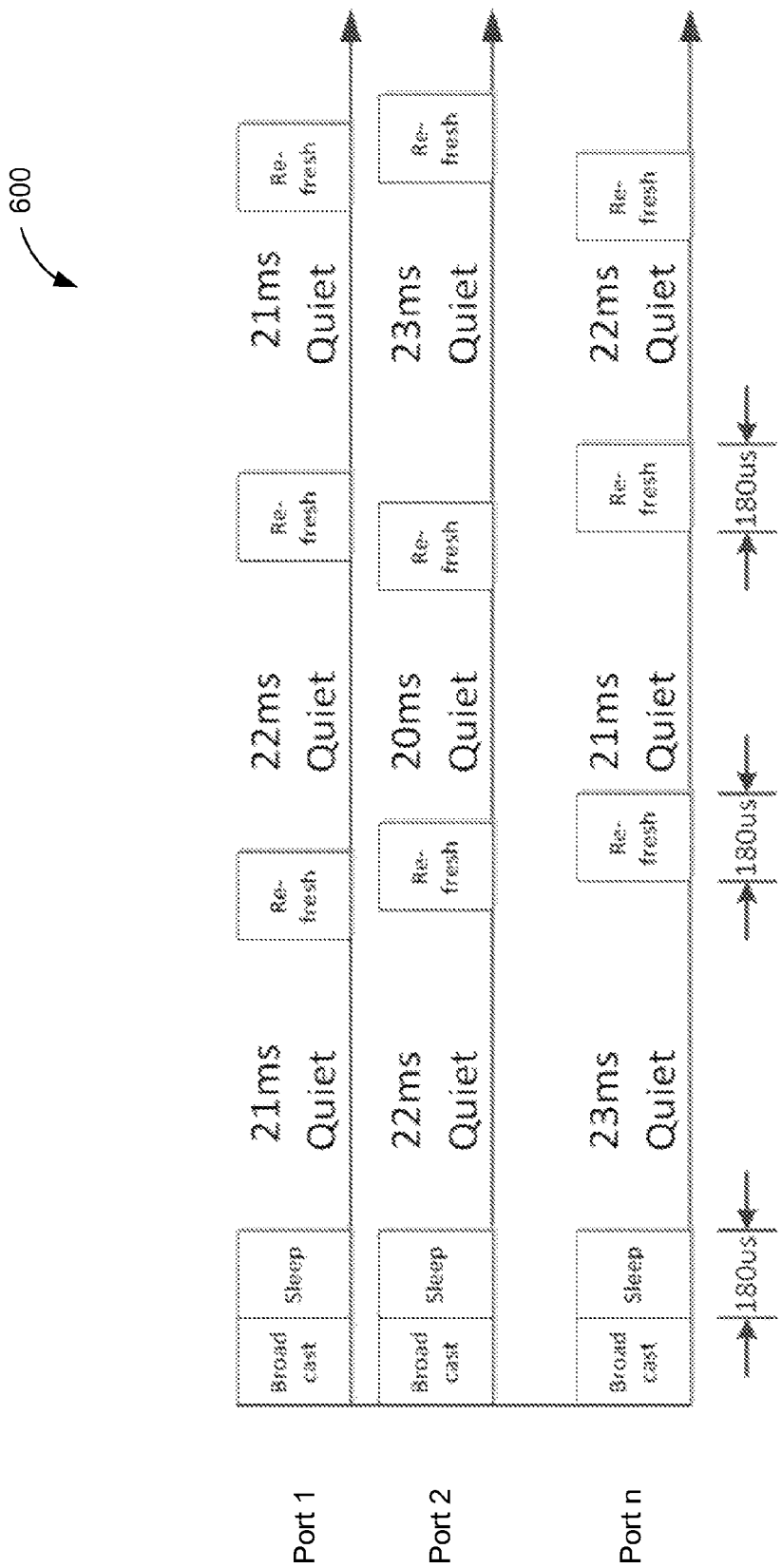
FIG. 6A is an illustration depicting different quiet period durations for different ports of a network-enabled device in accordance with some embodiments.

For example, during a first low power mode, timer signal T1 may set timer Timer_1 to a count value indicative of a 21 ms quiet period, timer signal T2 may set timer Timer_2 to a count value indicative of a 22 ms quiet period, and timer signal Tn may set timer Timer_n to a count value indicative of a 23 ms quiet period. Thus, as depicted in FIG. 6A, AFE circuit 222(1)/Port P1 may commence the refresh operation 21 ms after entering a first sleep state, AFE circuit 222(2)/Port P2 may commence the refresh operation 22 ms after entering a first sleep state, and AFE circuit 222(n)/Port Pn may commence the refresh operation 23 ms after entering a first sleep state. In this manner, the AFE circuits 222(1)-222(n)/Ports P1-Pn wake-up to commence their first refresh operations at different times (even though they may have entered the first sleep state at the same time).

Then, during a second low power mode, timer signal T1 may set timer Timer_1 to a count value indicative of a 22 ms quiet period, timer signal T2 may set timer Timer_2 to a count value indicative of a 20 ms quiet period, and timer signal Tn may set timer Timer_n to a count value indicative of a 21 ms quiet period. Thus, as depicted in FIG. 6A, AFE circuit 222(1)/Port P1 may commence the refresh operation 22 ms after entering a second sleep state, AFE circuit 222(2)/Port P2 may commence the refresh operation 20 ms after entering a second sleep state, and AFE circuit 222(n)/Port Pn may commence the refresh operation 21 ms after entering a second sleep state. In this manner, the AFE circuits 222(1)-222(n)/Ports P1-Pn wake-up to commence their second refresh operations at different times, and each of the AFE circuits 222(1)-222(n)/Ports P1-Pn has different quiet period durations for the first low power mode and the second low power mode.

Then, during a third low power mode, timer signal T1 may set timer Timer_1 to a count value indicative of a 21 ms quiet period, timer signal T2 may set timer Timer_2 to a count value indicative of a 23 ms quiet period, and timer signal Tn may set timer Timer_n to a count value indicative of a 22 ms quiet period. Thus, as depicted in FIG. 6A, AFE circuit 222(1)/Port P1 may commence the refresh operation 21 ms after entering a third sleep state, AFE circuit 222(2)/Port P2 may commence the refresh operation 23 ms after entering a third sleep state, and AFE circuit 222(n)/Port Pn may commence the refresh operation 22 ms after entering a third sleep state. In this manner, the AFE circuits 222(1)-222(n)/Ports P1-Pn wake-up to commence their third refresh operations at different times, and each of the AFE circuits 222(1)-222(n)/Ports P1-Pn has different quiet period durations for the first low power mode, the second low power mode, and the third low power mode.

Figure 3:
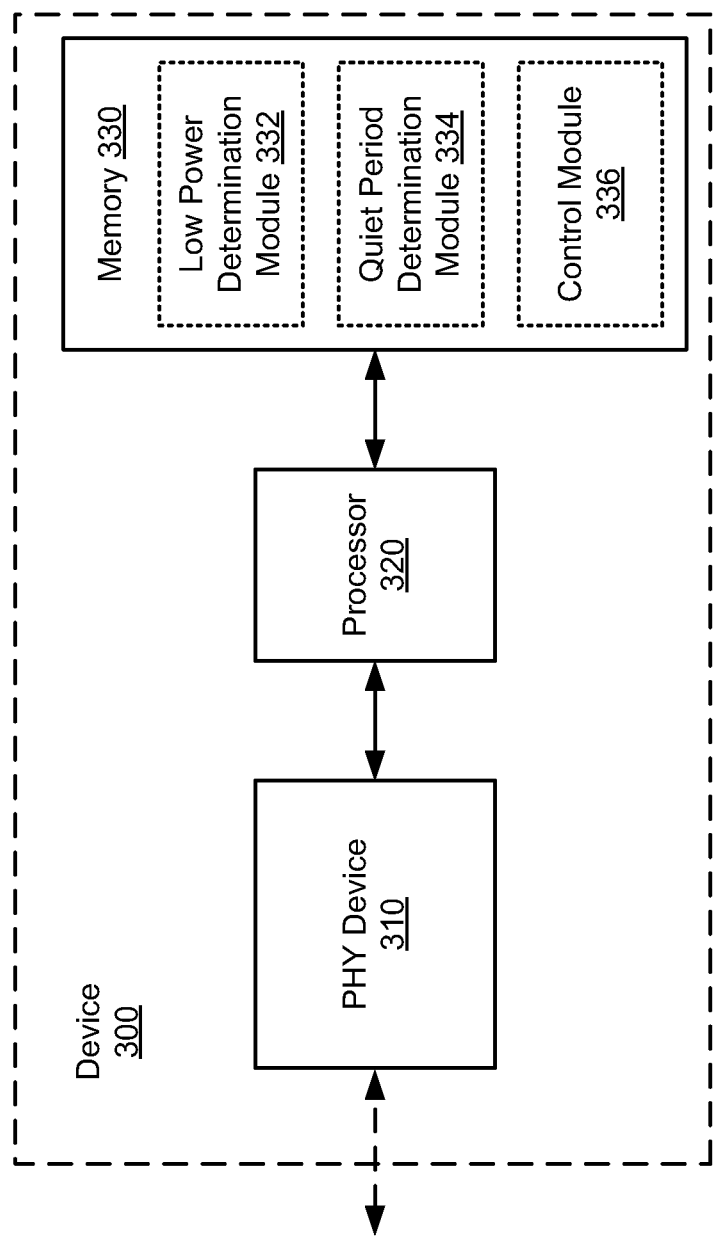
FIG. 3 is another block diagram of a network-enabled device in accordance with at least one embodiment.

FIG. 3 illustrates a network-enabled device 300 that is one embodiment of device 200 of FIG. 2A. The device 300 is shown to include a PHY device 310, a processor 320, and a memory 330. The PHY device 310 may include ports P1-Pn, transceiver 220, and baseband processor 240 of FIG. 2A. The PHY device 310 may be used to communicate with one or more other network-enabled devices either directly or via one or more intervening networks. Processor 320, which is coupled to the PHY device 310 and the memory 330, may be any suitable processor capable of executing scripts or instructions stored in the device 300 (e.g., within memory 330). In one embodiment, the processor 320 may execute instructions stored in the memory 330 to determine whether to place the transceiver of the PHY device 310 in a low power mode or a normal operating mode, and to control the powering-on and powering-off of selected components (e.g., the ADCs and DACs) of AFE circuits 222(1)-222(n) of FIG. 2A.

For the exemplary embodiment of FIG. 3, the PHY device 310 may not include LPI control circuit 230 of FIG. 2A. Instead, the processor 320 may execute instructions stored in the memory 330 to perform the functions of LPI control circuit 230 (e.g., determine whether to place transceiver 220 in the low power mode, to wake transceiver 220 up from the low power mode, to stagger the powering on and off of selected components of each of AFE circuits 222(1)-222(n), and/or to assign different quiet period durations to each of AFE circuits 222(1)-222(n)).

Memory 330 may include a non-transitory computer-readable medium (e.g., one or more nonvolatile memory elements, such as EPROM, EEPROM, Flash memory, a hard drive, and so on) that may store the following software modules:

- a low power determination module 332 to determine whether to place the transceiver in a low power mode or a normal mode;
- a quiet period determination module 334 to determine the quiet period durations for each of the AFE circuits 222(1)-222(n); and
- a control module 336 to control the powering-off and/or powering-on of the ADCs and DACs within AFE circuits 222(1)-222(n).

Each software module may include instructions that, when executed by the processor 320, may cause the device 300 to perform the corresponding function. Thus, the non-transitory computer-readable storage medium of memory 330 may include instructions for performing all or a portion of the operations described below with respect to FIG. 4.

The processor 320, which is coupled to PHY device 310 and memory 330, may execute scripts or instructions stored within the memory 330 to control a number of transceiver components of the PHY device 310. For example, the processor 320 may execute the low power determination module 332, the quiet period determination module 334, and the control module 336.

In some embodiments, the low power determination module 332 may be executed by the processor 320 to determine whether to place the transceiver 220 in a low power mode or a normal operating mode. For example, when the transceiver 220 is operating in a normal operating mode, the processor 320 may determine that there is little or no data to be transmitted to another network-enabled device. The processor 320 may then determine that the transceiver 220 is to enter the low power mode. Similarly, when the transceiver 220 is in the low power mode, the processor 320 may determine that there is data to be transmitted to another-network enabled device, and determine that the transceiver 220 is to be woken up (e.g., and operated in the normal operating mode).

The quiet period determination module 334 may be executed by the processor 320 to determine the quiet period durations for each of the AFE circuits 222(1)-222(n). The processor 320 may assign different durations of time for the quiet period of each of the AFE circuits 222(1)-222(n) so that when transceiver 220 is placed in the low power mode, the AFE circuits 222(1)-222(n) and/or their internal transceiver chains wake up at different times (e.g., to perform a refresh operation). The processor 320 may assign, to each of the AFE circuits 222(1)-222(n), a quiet period duration that is within a range of durations complying with the EEE standards. In addition, for at least one embodiment, the processor 320 may execute the quiet period determination module 334 to determine the quiet period durations at any time, such as before, after, or while determining whether to change operating modes of the transceiver 220.

The control module 336 may be executed by the processor 320 to control AFE circuits 222(1)-222(n) of FIG. 2A to power-off and/or power-on the AFE circuits 222(1)-222(n), and in particular, the ADCs and/or DACs of FIG. 2B, at different times. For example, when the processor 320 determines that transceiver 220 is to be woken up, the processor 320 may provide control signals C1-Cn and/or timer signals T1-Tn to transceiver 220 that cause the AFE circuits 222(1)-222(n) to power-off and/or power-on at different times.

Figure 4:
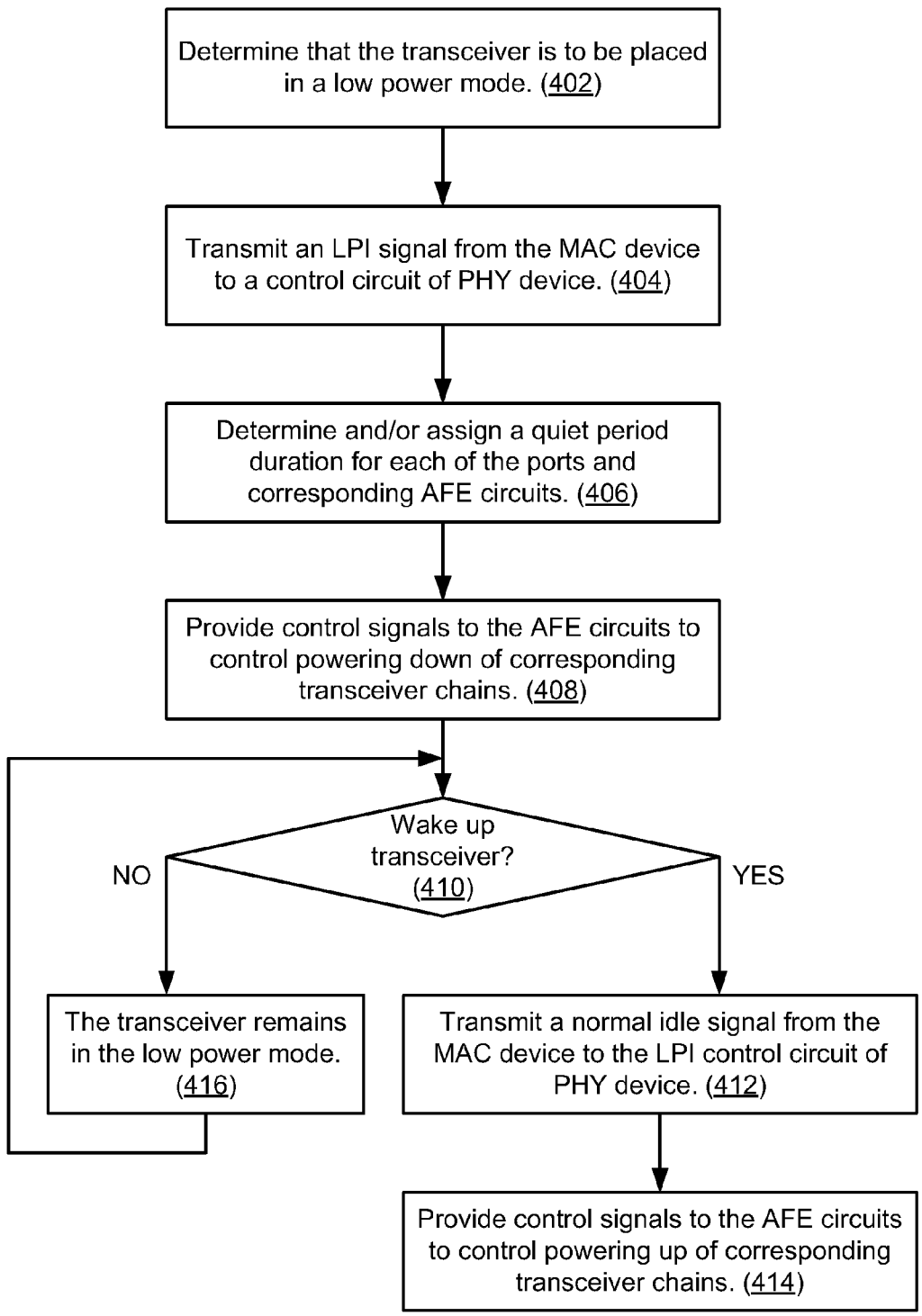
FIG. 4 is an illustrative flow chart depicting an exemplary operation of a network-enabled device in accordance with some embodiments.

FIG. 4 is an illustrative flow chart depicting an exemplary operation 400 of a network-enabled device in accordance with the present embodiments. As described above, the present embodiments may allow device 200 to reduce current transients associated with simultaneously powering-on many transceiver components, for example, by staggering the times at which various transceiver components are powered-on and/or powered-off, and/or by assigning different quiet period durations to various transceiver components.

Referring to FIG. 2A, for some embodiments, the device 200 first determines that the transceiver 220 is to be placed in a low power mode (402). The network-enabled device 200 may determine that the transceiver 220 is to be placed in the low power mode by determining that little or no data is to be transmitted from the PHY device 210. The MAC device 250 may transmit an asserted LPI signal to the LPI control circuit 230 of the PHY device 210 (404).

For embodiments in which device 200 includes multiple ports P1-Pn (e.g., as depicted in FIG. 2A), the LPI control circuit 230 may determine a quiet period duration for transceiver components associated with each of the ports P1-Pn (406). The LPI control circuit 230 may assign the quiet period durations (e.g., as embodied by timer signals T1-Tn) to timers Timer_1-Timer_n, which in turn may control the quiet period durations of corresponding AFE circuits 222(1)-222(n). The LPI control circuit 230 may also provide control signals C1-Cn to respective AFE circuits 222(1)-222(n), for example, to control power-off times and/or power-on times of transceiver components therein (e.g., DACs and ADCs) (408).

When the device 200 determines that the transceiver 220 is to be woken-up, as tested at 410, the MAC device 250 may transmit a de-asserted LPI signal (or alternatively a normal idle signal) to the LPI control circuit 230 of the PHY device 210 (412). The LPI control circuit 230 may receive the de-asserted LPI signal (or the normal idle signal), and in response thereto, may provide control signals C1-Cn to respective AFE circuits 222(1)-222(n) (414). As discussed above, the control signals C1-Cn may cause a number of transceiver components (e.g., DACs and ADCs) of the AFE circuits 222(1)-222(n) to power-on and/or power-off at different times.

Figure 5:
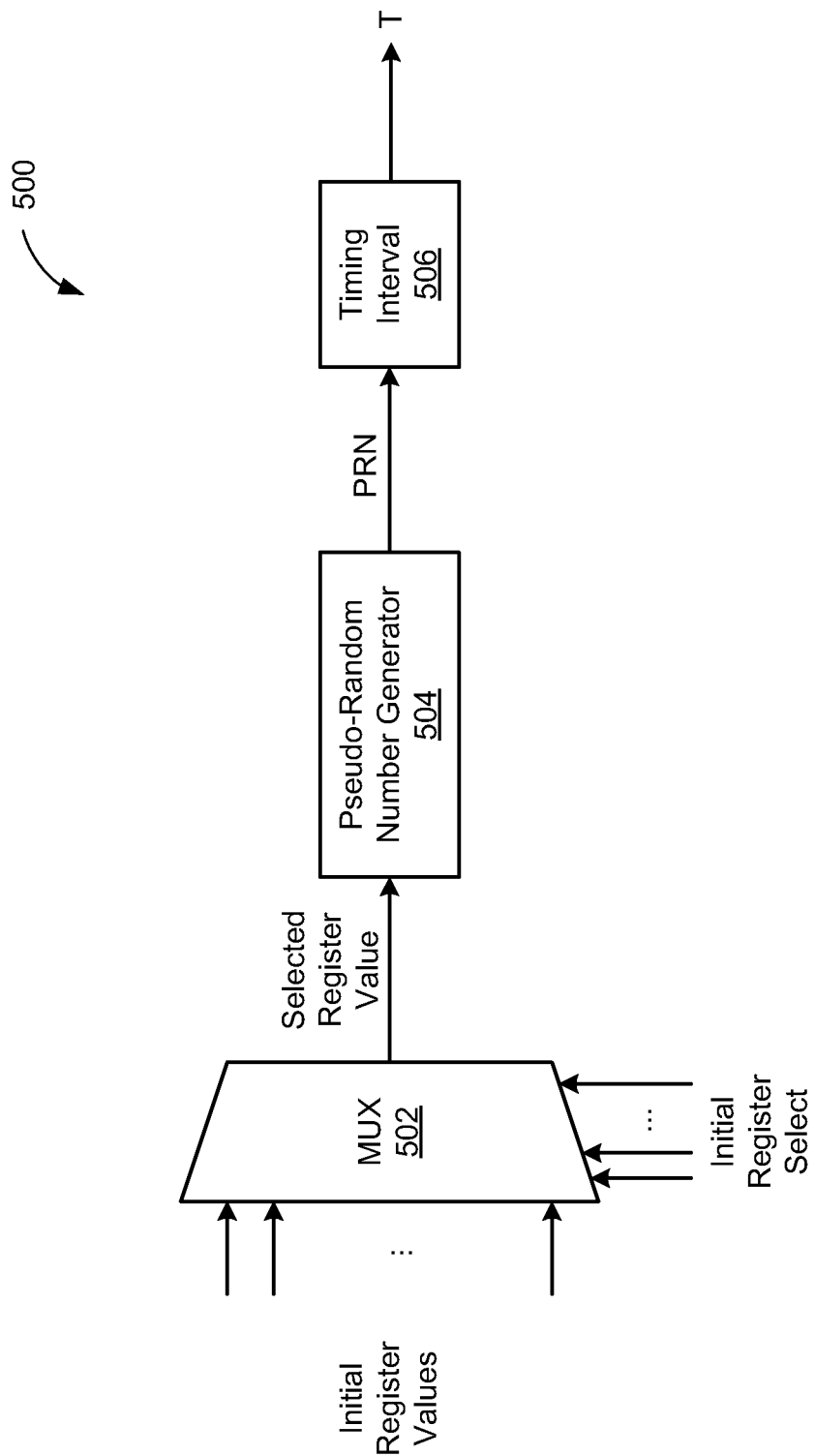
FIG. 5 is a block diagram of a mechanism to determine quiet period durations in accordance with the present embodiments.

FIG. 5 is a block diagram of a mechanism 500 to determine quiet period durations, according to some embodiments. The mechanism 500 may be implemented in the LPI control circuit 230 of FIG. 2A, for example, to assign quiet period durations to AFE circuitry associated with one or more different ports of device 200. In one embodiment, mechanism 500 includes a multiplexer 502, a pseudo-random number generator 504, and a timing interval circuit 506.

A set of initial register values are provided as input signals to multiplexer 502, which provides one of the initial register values to the pseudo-random number generator 504 in response to a set of initial register select signals. For some embodiments, the initial register values may be generated in a random manner. The pseudo-random number generator 504 may use the selected register value, provided by multiplexer 502, to generate a pseudo-random number (PRN). The timing interval circuit 506 may use the PRN to assign a quiet period duration (e.g., having a value between 20 ms and 24 ms) to the output timer signal T.

Figure 6B:
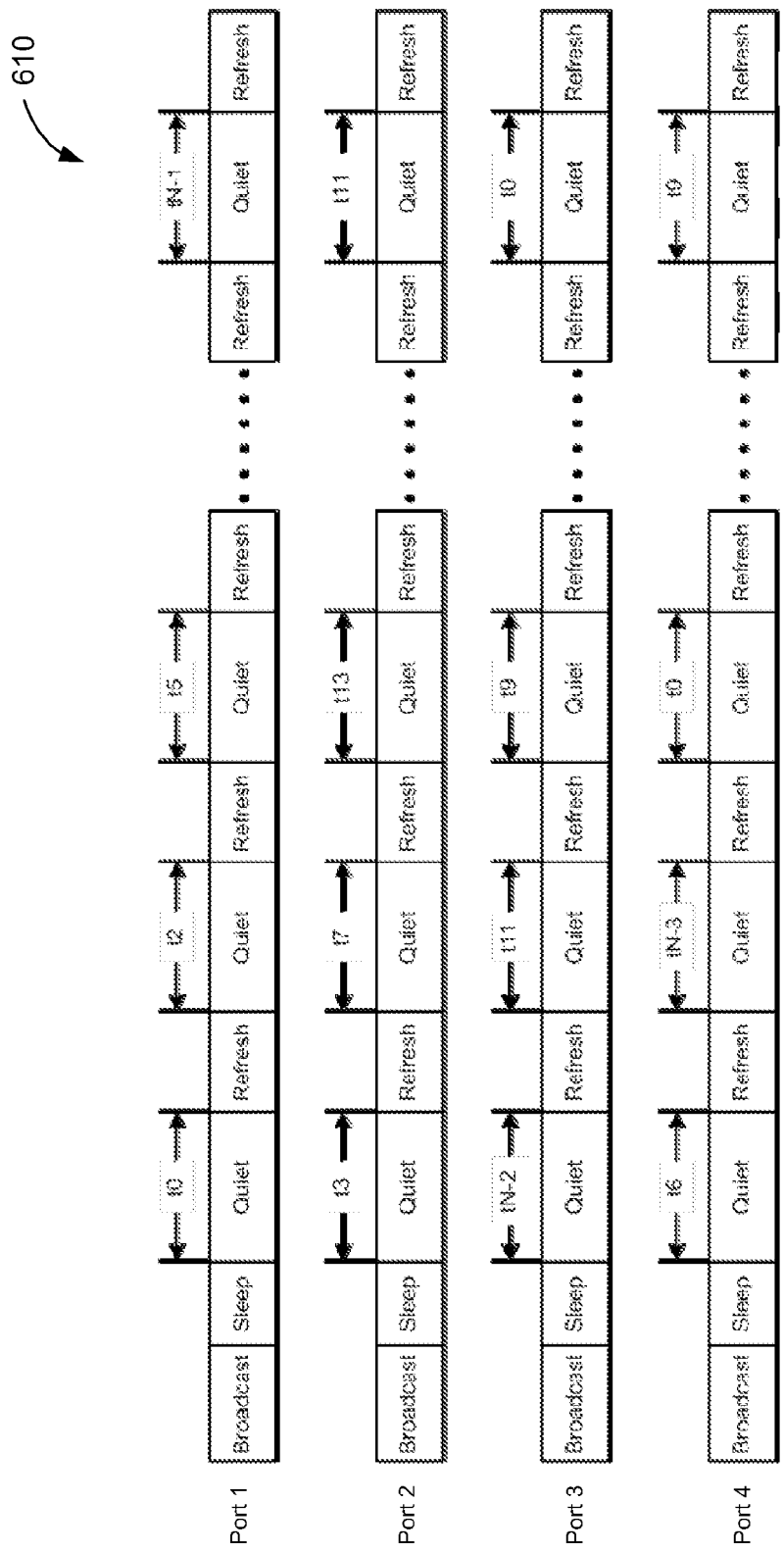
FIG. 6B is an illustration depicting assignment of timer signals indicative of different quiet period durations for different ports of a network-enabled device in accordance with some embodiments.

For at least some embodiments, the pseudo-random number generator 504 may use linear feedback shift registers (not shown for simplicity) to randomly select the quiet period durations for corresponding AFE circuits 222(1)-222(n). Each of the quiet period durations may then be mapped to a sequence of numbers (e.g., t0, t1, t2, t3, . . . tN−1, where N is an integer), for example, as depicted in FIG. 6B. For example, number t0 may map to 21 ms, number t1 may map to 24 ms, number t3 may map to 20 ms, number t4 may map to 20 ms, . . . number tN−2 may map to 22 ms, etc.

For example, for embodiments in which device 200 includes four AFE circuits 222(1)-222(4) coupled to four ports P1-P4, respectively, the LPI control circuit 230 may use the mechanism 500 to assign different quiet period durations to various pairs of AFE circuits 222/ports P. More specifically, AFE circuit 222(1) and Port 1 may be assigned quiet period duration numbers t0, t2, t5, etc., AFE circuit 222(2) and Port 2 may be assigned quiet period duration numbers t3, t7, t13, etc., AFE circuit 222(3) and Port 3 may be assigned quiet period duration numbers tN−2, t11, t9, etc., and AFE circuit 222(4) and Port 4 may be assigned quiet period duration numbers t6, tN−3, t0, etc., as depicted in FIG. 6B. In this manner, current transients associated with powering-on and/or powering-off transceiver components may be reduced by minimizing the number of transceiver components that powered-on and/or powered-off at the same time.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense. For example, method depicted in the flow chart of FIG. 4 may be performed in other suitable orders and/or one or more methods steps may be omitted.

What is claimed is:

1. An Ethernet device, comprising:
a media access control (MAC) device to provide a low-power idle (LPI) signal;
a first port coupled to a plurality of first external communication channels; and
a physical (PHY) device, coupled to the MAC device via a media independent interface (MII), comprising:
a transceiver including a plurality of first transceiver chains, each coupled to a corresponding one of the first external communication channels via the first port, wherein each of the first transceiver chains includes at least a digital-to-analog converter (DAC) and an analog-to-digital converter (ADC); and
a control circuit to generate a plurality of first control signals based on the LPI signal, wherein the first control signals are de-asserted in a staggered manner with respect to one another, and wherein each of the first control signals is provided to a corresponding one of the first transceiver chains to power on the ADCs and the DACs of each of the first transceiver chains at different times.

2. The Ethernet device of claim 1, wherein the control circuit is to assign a different quiet period duration to each of the first transceiver chains.

3. The Ethernet device of claim 2, wherein the different quiet period durations are within a range of predetermined durations of time.

4. The Ethernet device of claim 2, wherein the control circuit includes a pseudo-random number generator to randomly select the different quiet period durations.

5. The Ethernet device of claim 1, wherein the control circuit is to assign, for each of the first transceiver chains, different durations of time for successive quiet periods of the corresponding one of the first transceiver chains.

6. The Ethernet device of claim 1, wherein:
the ADC and the DAC of a first one of the first transceiver chains are powered on at a first time; and
the ADC and the DAC of a second one of the first transceiver chains are powered on at a second time that is different from the first time.

7. The Ethernet device of claim 1, further comprising:
a second port coupled to a plurality of second external communication channels;
the transceiver includes a plurality of second transceiver chains, each coupled to a corresponding one of the second external communication channels via the second port, wherein each of the second transceiver chains includes at least a DAC and an ADC; and
the control circuit is to power on the ADCs and the DACs of the second transceiver chains at different times than the ADCs and the DACs of the first transceiver chains.

8. The Ethernet device of claim 7, wherein the control circuit is to generate a plurality of second control signals, wherein each of the second control signals is provided to a corresponding one of the second transceiver chains, and wherein the second control signals are to be de-asserted in a staggered manner with respect to the first control signals.

9. The Ethernet device of claim 7, wherein the control circuit is to assign different quiet period durations to the first transceiver chains and the second transceiver chains.

10. A method of reducing current transients in an Ethernet device including a plurality of first transceiver chains each coupled to a respective one of a plurality of first external communication channels via a first port, the method comprising:
providing a low power idle (LPI) signal indicative of a low power mode of the Ethernet device;
generating a plurality of first control signals based on a state of the LPI signal, wherein the first control signals are de-asserted in a staggered manner with respect to one another; and
selectively powering-off portions of the plurality of first transceiver chains at different times in response to the plurality of first control signals.

11. The method of claim 10, wherein the portions each include at least a digital-to-analog converter (DAC) and an analog-to-digital converter (ADC).

12. The method of claim 10, wherein the selectively powering-off comprises:
powering-off at least a first digital-to-analog converter (DAC) and a first analog-to-digital converter (ADC) of the first transceiver chain at a first time; and
powering-off at least a second DAC and a second ADC of the second transceiver chain at a second time that is different from the first time.

13. The method of claim 10, further comprising:
assigning a different quiet period duration to each of the first transceiver chains.

14. The method of claim 10, wherein the different quiet period durations are randomly generated by a pseudo-random number generator.

15. The method of claim 10, further comprising:
assigning, for a respective transceiver chain, different durations of time for successive quiet periods of the respective transceiver chain.

16. The method of claim 10, wherein the Ethernet device includes a plurality of second transceiver chains each coupled to a respective one of a plurality of second external communication channels via a second port, the method further comprising:
generating a plurality of second control signals based on the state of the LPI signal; and
selectively powering-off portions of the plurality of second transceiver chains at different times than powering-off the portions of the plurality of first transceiver chains.

17. An Ethernet device, comprising:
a first port coupled to a plurality of first external communication channels;
a transceiver including a plurality of first transceiver chains, each coupled to a corresponding one of the first external communication channels via the first port, wherein each of the first transceiver chains includes at least a digital-to-analog converter (DAC) and an analog-to-digital converter (ADC);
one or more processors; and
a non-transitory memory storing instructions that, when executed by the one or more processors, cause the Ethernet device to:
provide a low power idle (LPI) signal indicative of a low power mode of the Ethernet device;
generate a plurality of first control signals based on a state of the LPI signal, wherein the first control signals are de-asserted in a staggered manner with respect to one another; and
selectively power-off portions of the plurality of first transceiver chains at different times in response to the plurality of first control signals.

18. The Ethernet device of claim 17, wherein the portions each include at least a digital-to-analog converter (DAC) and an analog-to-digital converter (ADC).

19. The Ethernet device of claim 17, wherein execution of the instructions to selectively power-off further cause the Ethernet device to:
power-off at least a first digital-to-analog converter (DAC) and a first analog-to-digital converter (ADC) of the first transceiver chain at a first time; and
power-off at least a second DAC and a second ADC of the second transceiver chain at a second time that is different from the first time.

20. The Ethernet device of claim 17, wherein execution of the instructions further cause the Ethernet device to:
assign a different quiet period duration to each of the first transceiver chains.

21. The Ethernet device of claim 17, wherein the different quiet period durations are randomly generated by a pseudo-random number generator.

22. The Ethernet device of claim 17, wherein execution of the instructions further cause the Ethernet device to:
assign, for a respective transceiver chain, different durations of time for successive quiet periods of the respective transceiver chain.

23. The Ethernet device of claim 17, wherein the Ethernet device includes a plurality of second transceiver chains each coupled to a respective one of a plurality of second external communication channels via a second port, wherein execution of the instructions further cause the Ethernet device to:
generate a plurality of second control signals based on the state of the LPI signal; and
selectively power-off portions of the plurality of second transceiver chains at different times than powering-off the portions of the plurality of first transceiver chains.

24. An Ethernet device including a plurality of first transceiver chains each coupled to a respective one of a plurality of first external communication channels via a first port, the Ethernet device comprising:
means for providing a low power idle (LPI) signal indicative of a low power mode of the Ethernet device;
means for generating a plurality of first control signals based on a state of the LPI signal, wherein the first control signals are de-asserted in a staggered manner with respect to one another; and
means for selectively powering-off portions of the plurality of first transceiver chains at different times in response to the plurality of first control signals.

25. The Ethernet device of claim 24, wherein the means for selectively powering-off is to:
power-off at least a first digital-to-analog converter (DAC) and a first analog-to-digital converter (ADC) of the first transceiver chain at a first time; and
power-off at least a second DAC and a second ADC of the second transceiver chain at a second time that is different from the first time.

26. The Ethernet device of claim 24, further comprising:
means for assigning a different quiet period duration to each of the first transceiver chains.

* * * * *